3,474,048
POLYMER FOAMS REINFORCED WITH GLASS OR ASBESTOS FIBERS AND PROCESS OF MAKING SAME
David C. Chappelear, Thomas J. Stolki, Seymour Newman, and Quirino A. Trementozzi, Springfield, Mass., assignors to Monsanto Company, St. Louis, Mo., a corporation of Delaware
No Drawing. Filed Jan. 3, 1966, Ser. No. 517,955
Int. Cl. C08f 47/10, 45/10
U.S. Cl. 260—2.5                            14 Claims

ABSTRACT OF THE DISCLOSURE

This invention relates to a foamed thermoplastic resin containing a fibrous component of either glass or asbestos fibers which are substantially tougher and stronger than the foamed phase and the process of making said foamed product.

---

This invention relates to novel foamed thermoplastic resins. More particularly it relates to novel foamed thermoplastic resins which are reinforced with a second component which is fibrous.

During recent years the foaming of thermoplastic resins has grown in commercial importance. Foamed thermoplastic resins find wide and practical use in such varied applications as thermal and acoustical insulation, shockproof shipping containers, ice buckets, beverage coolers, cups, toys, hospital pads, boating equipment, padded dashboards, visors in vehicles, cores for sandwich structures, etc.

In spite of the large growth and wide acceptance, foamed thermoplastic resins still have major shortcomings, such as poor tensile and tear strength which seriously limits their use.

An object of this invention is to provide foamed thermoplastic resins with greater tear and tensile strength.

Another object of this invention is to provide a method for producing foamed thermoplastic resins with greater tear and tensile strength.

These and other objects are attained by producing a foamed thermoplastic resin reinforced with fibers, wherein the fibrous component is selected from the group consisting of inorganic glass and asbestos fibers; wherein the fibrous phase has a substantially greater toughness than the foamed phase.

The following examples are given in illustration of the invention and are not intended as limitations thereof. All parts and percentages are by weight unless otherwise specified.

Example I

This example deals with unreinforced polystyrene foam and is set forth as a control to illustrate the better physical properties that are achieved with the reinforced foams of this invention.

The following charge is placed in a covered, jacketed ribbon blender:

Parts
20 mesh granular styrene with a Staudinger molecular weight of about 55,000 _____ 100
Colloidal silica _____ 3

The atmospheric oxygen is purged from the blender with nitrogen to a level of less than 6% oxygen. The styrene-silica mixture is then sprayed with 10 parts of a 95:5 pentane/acetone solution and blended for 30 minutes.

The above mixture is fed into a 2½ inch extruder which is maintained at the following conditions:

Degrees, F.
Hopper _____ 80
Feed zone _____ 80–90
Middle zone _____ 250
Die zone _____ 300
Sheet die _____ 300 with a 22 L/D screw speed at 36 r.p.m. Foam is extruded through a sheet die at a rate of 100 lbs./hr. and a stock temperature of 290° F. The foam obtained has a thickness of about 0.1 inch and a density of from 2 to 4 lbs./cu. ft.

Example II

This example illustrates a method of reinforcing foam with inorganic glass fibers.

Fifteen parts of sized glass fibers up to ½ inch in length and with an L/D ratio of greater than 20 are blended with 85 parts of 20 mesh granular styrene (M.W. 55,000). The glass fibers are sized with a silane of the type, $$H_2N(CH_2)-Si-(OCH_3)_3$$

in order to improve their adhesion to the foamed phase.

This material is extruded into a ⅛ inch diameter rod in a 3 zone extruder having the following temperatures.

Degrees, F.
Hopper _____ 60–100
Feed zone _____ 300
Middle zone _____ 550
Die zone _____ 550

Upon cooling, the rod is chopped into ½ inch long pellets. The pellets are steeped for 7 days in methylene chloride and then foamed according to the procedure of Example I to produce a styrene foam reinforced with glass fibers. This reinforced polystyrene foam, which has a thickness of about 0.1 inch and a density of from 2 to 4 lbs./cu. ft., is found to have better physical properties, e.g. tear and tensile strength, than the unreinforced polystyrene foam of Example I, when tested by manually tearing and pulling the samples.

Example III

This example is also set forth as a control to illustrate the poorer tensile strength of polyethylene foams that contain no reinforcing fibers.

100 parts of a granular high density polyethylene with a density of 0.96 and a melting range of 127–132° C. (260–270° F.) is fed into an extruder wherein a trichlorofluoromethane foaming agent is directly injected into the molten polyethylene according to the process outlined in U.S. Patent 3,160,688, under the following conditions:

Zone:                                          Degrees, F.
    1 _____ 302
    2 _____ 302
    3 _____ 266
    Die _____ 248

The resulting unreinforced foam which has a thickness of about 0.1 inch and a density of from 2 to 4 lbs./cu. ft. is then compared to the reinforced foam of Example IV.

Example IV

This example illustrates a method of reinforcing polyethylene foam using inorganic glass fibers.

20 parts of glass fibers (sized as in Example II) up to ½ inch in length and with an L/D ratio of greater than 20 are blended with 80 parts of a granular low pressure polyethylene with a density of 0.950 and a melting range of 127–132° C. (260–270° F.). This material is extruded into a ⅛ inch diameter rod in a 3 zone extruder having the following temperatures:

| Zone | Degrees, F. |
| --- | --- |
| 1 | 338 |
| 2 | 482 |
| 3 | 500 |
| Die | 500 |

The composite monofilament formed at an extrusion rate of 37 lbs./hr. at 120 r.p.m. is cooled and chopped into ½ inch long pellets, which are foamed according to the procedure of Example III, except that the screens are removed from the extruder.

The resulting polyethylene foam, which has a thickness of about 0.1 inch and a density of from 2 to 4 lbs./cu. ft., is reinforced by the dispersed inorganic glass fibers and is found to have a greater tear and tensile strength than the unreinforced foam of Example III when the foams are tested by manually tearing and pulling the samples.

Example V

Example II is repeated here using sized asbestos fibers instead of sized glass fibers.

The resulting foam, which has a thickness of about 0.1 inch and a density of from 2 to 4 lbs./cu. ft., has tear strength comparable to the glass reinforced foam of Example II and is found to be significantly stronger than the unreinforced foam of Example I.

Example VI

Example IV is repeated here using sized asbestos fibers instead of sized glass fibers.

The resulting foam has a thickness of about 0.1 inch and a density of from 2 to 4 lbs./cu. ft. The tear strength of this foam is comparable to that of the glass reinforced foam of Example IV and significantly stronger than the unreinforced foam of Example III.

Example VII

This example is included to illustrate that the reinforcing effect of the fibrous phase of this invention is applicable to foams prepared from copolymers as well as to those prepared from homopolymers. Ninety parts of a styrene/acrylonitrile copolymer, which contains 90% by weight of styrene, is dry blended with 10 parts of sized inorganic glass fibers, extruded into a composite monofilament according to the procedure outlined in Example II. The pelletized material is steeped for 7 days in methylene chloride and then foamed according to the procedure of Example I.

The resulting reinforced foam which has a thickness of 0.1 inch and a density of 2 to 4 lbs./cu.ft. has excellent tear and tensile strength which surpasses that of the unreinforced foam of Example I.

In general any foamable thermoplastic resin may be reinforced in accordance with the teaching of this invention.

Examples of foamable thermoplastic resins which may be employed in the practice of this invention include polymers of the lower alpha olefins from 2 to 8 carbons, e.g., polyethylene, polypropylene, polybutene-1, polypentene-1 and their halogen and aliphatic substituted derivatives as represented by polyvinyl chloride, poly-4-methyl pentene-1, polyvinylidene chloride, etc.; polymers prepared from alkenyl aromatic monomers of the general formula:

$$H_2C=\underset{\underset{R_2}{|}}{C}-R_2$$

wherein $R_1$ is hydrogen, chlorine or methyl and $R_2$ is an aromatic radical of 6 to 10 carbon atoms which may also contain substituents such as halogens and alkyl groups attached to the aromatic nucleus, e.g., poly(styrene), poly(alpha-methylstyrene), poly(vinyl toluene), poly(alpha-chlorostyrene), poly(orthochlorostyrene), poly(para-chlorostyrene), poly(meta-chlorostyrene), poly(ortho-methylstyrene), poly(para-methylstyrene), poly(ethylstyrene), poly(isopropylstyrene), poly(dichlorostyrene), poly(vinylnaphthalene), etc.

One might also use copolymers of the foregoing alkenyl aromatic monomers and at least one copolymerizable vinylidene monomer. Preferred comonomers are those corresponding to the general formula:

$$H_2C=C<$$

Examples of these vinylidene monomers would include acrylonitrile, methacrylonitrile, vinyl halides, alkyl acrylates, and alkylmethacrylates, wherein the alkyl group contains from 1 to 12 carbon atoms; dialkyl maleates, dialkyl fumarates; conjugated dienes such as butadiene; vinyl esters of carboxylic acids such as vinyl acetate, vinyl propionate, vinyl butyrate, vinyl benzoate; vinyl ethers such as vinyl methyl ether, vinyl isobutyl ethers and other vinylidene monomers such as are known to those skilled in the art.

Equally useful in the practice of this invention would be polymers and copolymers which contain a synthetic or natural rubber component such as butadiene, neoprene, nitrile rubbers, polyisoprene, polyisobutylene, natural rubbers, acrylonitrile/butadiene/styrene, etc. These would include polyblends, graft copolymers and physical admixtures of a rubbery component with a rigid or semi-rigid component as well as the direct copolymerization of the rubbery monomer with the other monomers. These copolymer compositions are well known to those skilled in the polymer art and need no further explanation here.

Another group of foamable thermoplastic resins suitable for the practice of this invention would include polyvinyl esters prepared from monomers of the general formula:

$$H_2C=\underset{\underset{\underset{R_5}{|}}{\underset{|}{C=O}}}{\overset{H}{\underset{|}{C}}}$$

wherein $R_5$ is selected from the group comprising hydrogen, alkyl groups of from 1 to 10 carbon atoms, aryl groups of from 6 to 10 carbon atoms including the carbon atoms in ring substituted alkyl substituents; e.g., poly(vinyl formate), poly(vinyl acetate), poly(vinyl propionate) poly(vinyl benzoate) and the like.

Similar to the foregoing and equally useful are the vinyl ether type polymers prepared from monomers of the general formula:

$$H_2C=CH-O-R_6$$

wherein $R_6$ is an alkyl group of from 1 to 8 carbons, an aryl group of from 6 to 10 carbons, or a monovalent aliphatic radical of from 2 to 10 carbon atoms, which aliphatic radical may be hydrocarbon or oxygen containing, i.e., an aliphatic radical with ether linkages, and may also contain other substituents such as halogen, carbonyl, etc.

Examples of these polyvinyl ethers include poly(vinylmethyl ether), poly(vinyl ethyl ether), poly(vinyl n-butyl ether), poly(vinyl 2-chloroethyl ether), poly(vinyl phenyl ether), poly(vinyl isobutyl ether), poly(vinyl cyclohexyl ether), poly(p-butylcyclohexyl ether), poly(vinyl ether of p-chlorophenyl glycol), etc.

Other thermoplastic resins which may be used in the practice of this invention include cellulose ethers and esters, e.g., ethyl cellulose, cellulose actate, cellulose acetatebutyrate; polyformaldehyde; polyacetals, etc.

The practice of this invention contemplates the use of a foamable phase which is a copolymer, i.e., the polymeric product of two or more different monomers, as well as the use of a homopolymer foamable phase. As stated above, the concept of this invention includes polyblends, graft copolymers, and physical admixtures of polymers as well as copolymers prepared by the direct polymerization of two or more monomers for use as the foamable phase.

The fibrous phase must be selected so as to provide a second component which will reinforce and strengthen the foamed phase. The reinforcing effect can be explained by two mechanisms. When the fibrous phase is stronger and of higher modulus than the foamed phase, the fibrous phase will bear a significant portion of the load placed on the fiber-reinforced foam thereby increasing the strength of the foam. Secondly, the tear strength of the foam is improved by virtue of the redistribution of the stress and the stopping of a tear when its tip encounters a transverse fiber. Likewise, the stress concentration at the tip of a microscopic crack which is capable of propagating through the foam becomes substantially dissipated when it encounters a fiber which redistributes the stress and stops further propagation of the crack.

In general, for either mechanism to operate effectively, the fibrous phase must have a greater toughness than the foamed phase, i.e., the fibrous phase must absorb a greater amount of energy prior to failure than an equal volume of the foamed phase.

To achieve this reinforcing effect the fibers should have a length/diameter ratio ($L/D$) of at least 20 and up to 10,000, adequate adhesion to the foamed phase and a random distribution throughout the foamed phase. These fibers may be up to ½ inch in length and comprise up to 40% by weight of the reinforced foam.

The adhesion of the glass and asbestos fibers to the foam matrix may be improved by sizing the fibers. Materials suitable for this purpose are silanes of the type $H_2N(CH_2)=Si(OR)_3$, wherein R is a methyl or ethyl group.

Inorganic glass and asbestos fibers are the preferred materials used as the fibrous phase. More preferably one would use glass and asbestos fibers which are treated with a "coupling agent" such as the above-mentioned silanes to improve the adhesion between the glass and the polymer.

The composite monofilament of foamable thermoplastic resin containing the preformed fibers may be extruded, drawn and pelletized according to any of the conventional means for producing composite monofilaments, such as those described in U.S. Patents 3,097,991 and 3,099,067 and British Patent 930,074.

The foaming of the thermoplastic polymer may be accomplished by any of the conventional methods which are currently used to prepare low density foamed thermoplastic resins. These include such diverse methods as extruding thermoplastic beads or pellets which contain pneumatogens, e.g., Platzer, U.S. Patent 3,072,581; extrusion of thermoplastic wherein the pneumatogen is injected directly into the extrusion barrel such as is taught in Aykanian et al. U.S. Patent 3,160,688; and extrusion of thermoplastic resins containing a chemical blowing agent which decomposes at extrusion temperatures to foam the resin.

Other methods include foaming the resin in a mold by introducing the thermoplastic polymer into a mold along with any pneumatogens or chemical blowing agents and subjecting the same to heat and/or pressure to form the foamed polymer.

These and other methods should be familiar to those skilled in the art of preparing foamed thermoplastic resins and need not be described further here.

Also contemplated within the scope of this invention is the use of such materials as pigments, dyes, stabilizers, nucleating agents, fillers, plasticizers, etc.

It is apparent that many variations may be made in the products and processes of this invention without departing from the spirit and scope thereof.

What is claimed is:
1. A foamed thermoplastic resin reinforced with fibers, wherein the fibrous component is selected from the group consisting of inorganic glass and asbestos fibers which are substantially tougher and stronger than the foamed phase; wherein the reinforced foamed thermoplastic resin is produced by a process comprising:
   (A) blending a foamable thermoplastic resin with discrete fibers selected from the group consisting of inorganic glass or asbestos fibers,
   (B) heating the blend in an extruder to form a melt of the foamable thermoplastic resin,
   (C) extruding the melt through a die orifice thereby forming a composite monofilament having fibers within a matrix of foamable thermoplastic resin,
   (D) pelletizing the composite monofilament, and then
   (E) foaming the foamable thermoplastic resin.

2. A composition as in claim 1 wherein the foamed phase is an alkyl aromatic polymer.

3. A composition as in claim 2 wherein the foamed phase is polystyrene and the fibrous phase is inorganic glass fibers.

4. A composition as in claim 2 wherein the foamed phase is polystyrene and the fibrous phase is asbestos fibers.

5. A composition as in claim 1 wherein the foamed phase is a lower alpha-olefin.

6. A composition as in claim 5 wherein the foamed phase is polyethylene and the fibrous phase is inorganic glass fibers.

7. A composition as in claim 5 wherein the foamed phase is polyethylene and the fibrous phase is asbestos fibers.

8. A process for the production of a foamed thermoplastic resin reinforced with fibers, wherein the fibrous component is selected from the group consisting of inorganic glass and asbestos fibers which are substantially tougher and stronger than the foamed phase; said process comprising:
   (A) blending a foamable thermoplastic resin with discrete fibers selected from the group consisting of inorganic glass or asbestos fibers,
   (B) heating the blend in an extruder to form a melt of the foamable thermoplastic resin,
   (C) extruding the melt through a die orifice thereby forming a composite monofilament having fibers within a matrix of foamable thermoplastic resin,
   (D) pelletizing the drawn composite monofilament, and then
   (E) foaming the foamable thermoplastic resin.

9. A process as in claim 8 wherein the foamed phase is an alkyl aromatic polymer.

10. A process as in claim 9 wherein the foamed phase is polystyrene and the fibrous phase is inorganic glass fibers.

11. A process as in claim 9 wherein the foamed phase is polystyrene and the fibrous phase is asbestos fibers.

12. A process as in claim 8 wherein the foamed phase is a lower alpha-olefin.

13. A process as in claim 12 wherein the foamed phase is polyethylene and the fibrous phase is inorganic glass fibers.

14. A process as in claim 12 wherein the foamed phase is polyethylene and the fibrous phase is asbestos fibers.

References Cited
UNITED STATES PATENTS 3,062,682  11/1962  Morgan et al.
3,345,442  10/1967  Oxel.

SAMUEL H. BLECH, Primary Examiner
MORTON FOELAK, Assistant Examiner

U.S. Cl. X.R.

51—296; 106—122, 163; 260—41, 41.5; 264—47, 53, 174, 171, 210, 148